May 12, 1936. G. A. MACREADY Re. 19,963
APPARATUS FOR OBTAINING SAMPLES FROM DRILLED WELLS
Original Filed July 5, 1922 4 Sheets-Sheet 1
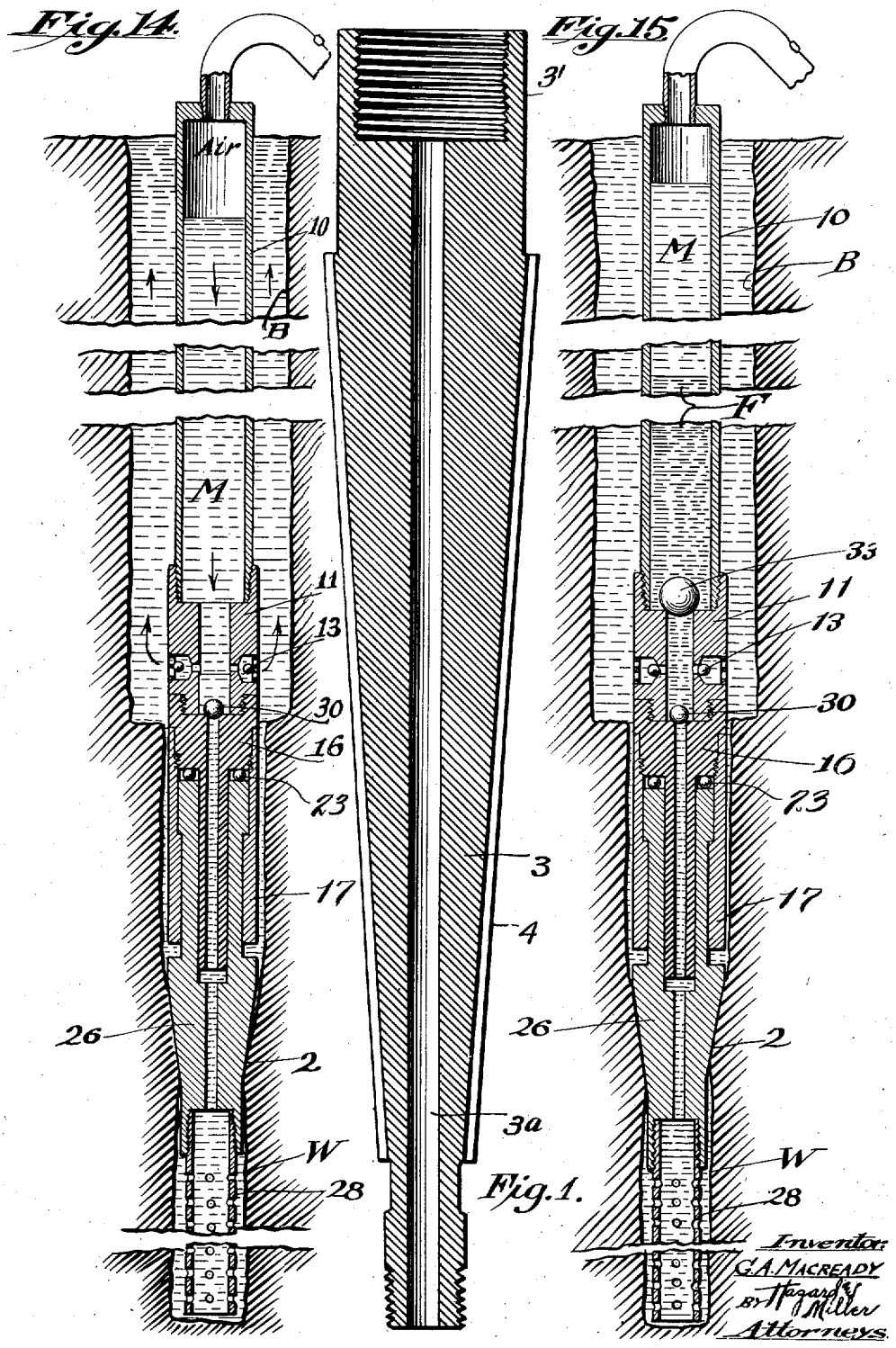

May 12, 1936. G. A. MACREADY Re. 19,963
APPARATUS FOR OBTAINING SAMPLES FROM DRILLED WELLS
Original Filed July 5. 1922 4 Sheets-Sheet 2
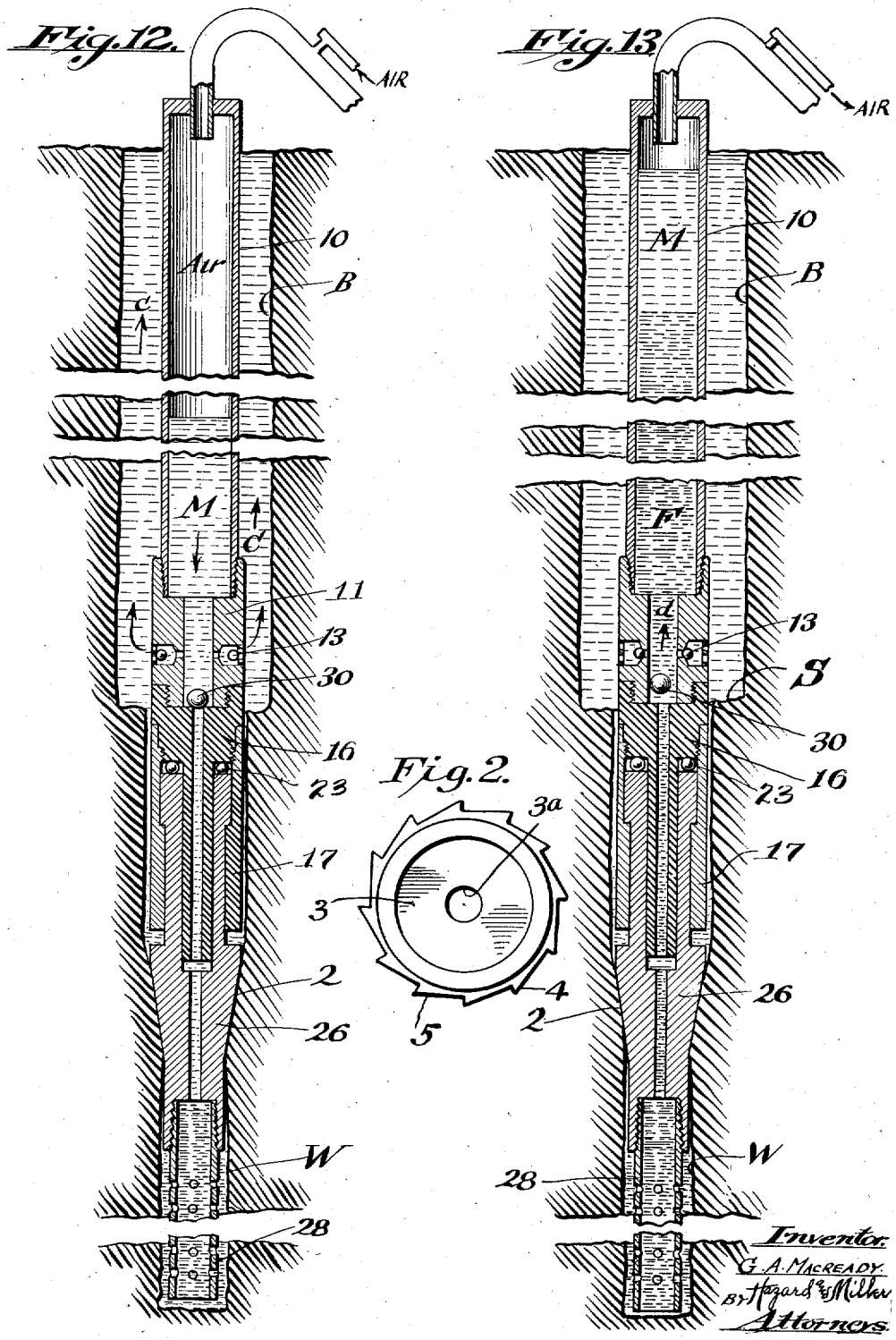

May 12, 1936. G. A. MACREADY Re. 19,963
APPARATUS FOR OBTAINING SAMPLES FROM DRILLED WELLS
Original Filed July 5, 1922 4 Sheets-Sheet 3
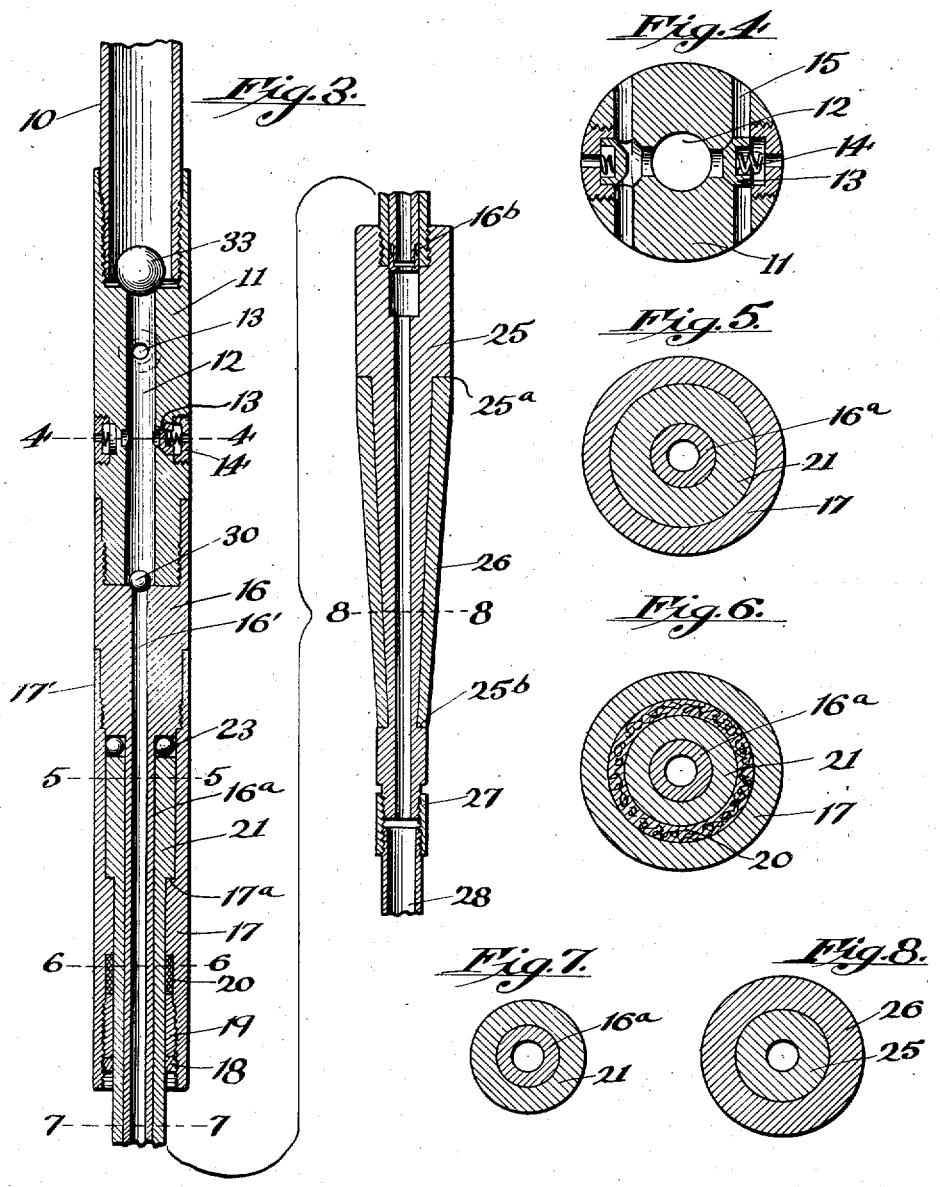
Inventor:
GEORGE A. MACREADY.
By Hazard & Miller
Attorneys May 12, 1936. G. A. MACREADY Re. 19,963
APPARATUS FOR OBTAINING SAMPLES FROM DRILLED WELLS
Original Filed July 5, 1922 4 Sheets-Sheet 4
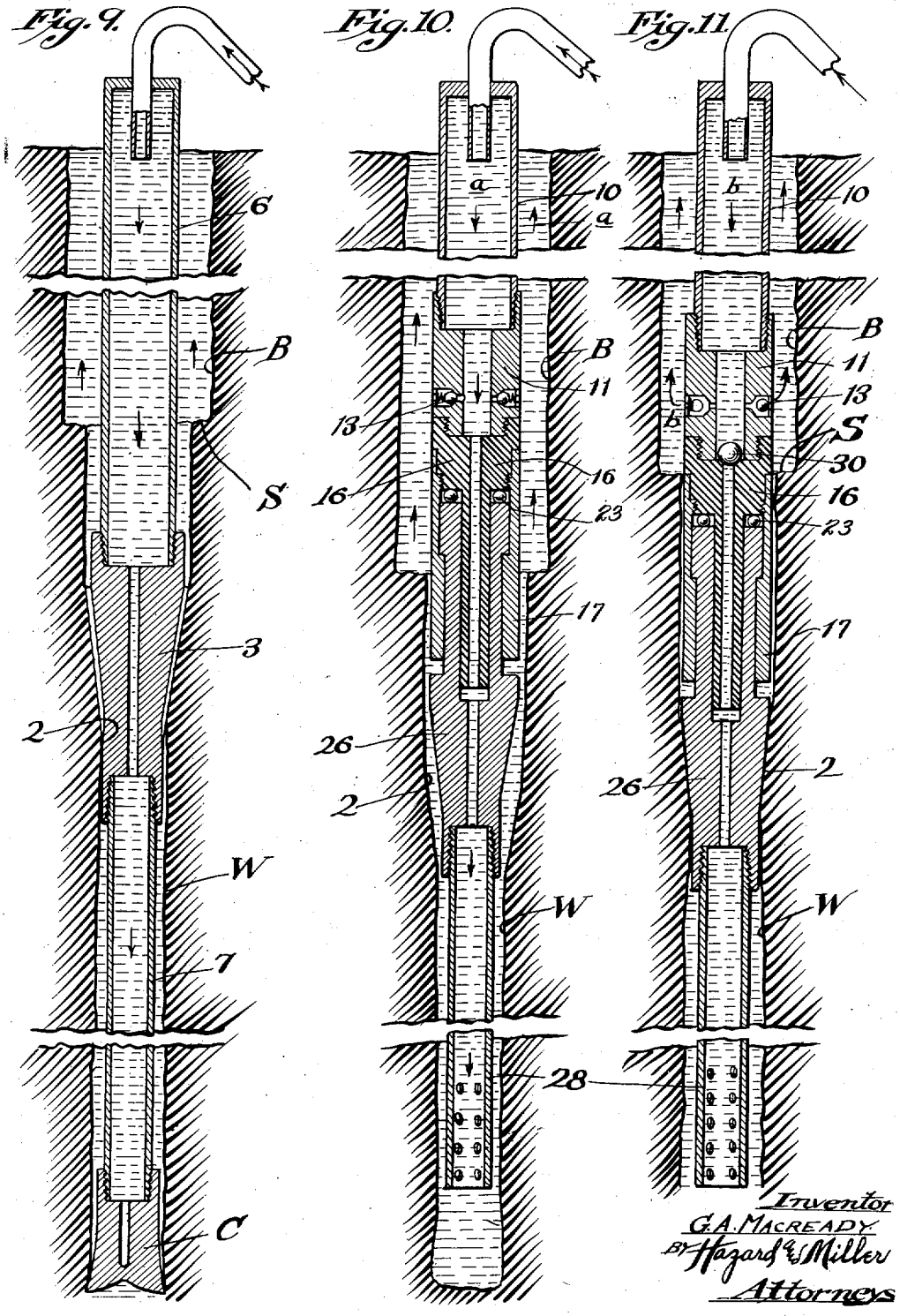

Reissued May 12, 1936 Re. 19,963

UNITED STATES PATENT OFFICE 19,963

APPARATUS FOR OBTAINING SAMPLES FROM DRILLED WELLS

George A. Macready, Los Angeles, Calif.

Original No. 1,896,522, dated February 7, 1933, Serial No. 572,889, July 5, 1922. Renewed October 10, 1927. Application for reissue February 2, 1934, Serial No. 709,518

8 Claims. (Cl. 166—1)

This invention relates to well drilling apparatus, and more particularly relates to drilled and bored wells.

The invention has for its broad object a provision of an apparatus for securing a sample of the natural fluid existant at the bottom of bored and drilled wells and especially the deep wells.

In the drilling of deep wells it is a frequent occurrence that the oil bearing strata are below one or more higher water bearing strata, and in such cases it is a very desirable practice to interpose a water seal between the oil bearing strata at the foot of the well and the higher water bearing strata. This division in the length of the well is more or less of a haphazard nature for the reason that the water seal may be introduced at a level above the oil bearing strata and also above a water bearing strata with the result that there is not an entire elimination of water from the bottom of the well, and the water below the seal, therefore, is drawn into, or flows into, the foot of the wall casing and mixes with the valuable oil. This is especially objectionable, since it depreciates the quality of the oil and as well, also, it reduces the maximum oil flow in direct proportion to the amount of water that commingles with the oil.

Therefore, it will be clear that a very important advance is made in this art by the provision of means for insuring the sealing of the well accurately and positively at such a point above the oil bearing strata as will exclude the mixture therewith of water from the higher levels.

Very expensively dug wells and very expensive apparatus are frequently totally lost because of the cementing in of a well at such point above the oil strata as to not exclude the admission of water to the oil and after the apparatus has been cemented in it is practically impossible to recover it.

Therefore, the present invention consists of an apparatus for determining accurately the proper level at which a deep well is to be sealed so as to exclude water from levels above the oil bearing strata.

Other objects will be made manifest in the following specification of an embodiment of the invention illustrated in the accompanying drawings, in which Figure 1 is a longitudinal central section of a seat cutting reamer.

Fig. 2 is a top plan view of the reamer shown in Fig. 1.

Fig. 3 is a central longitudinal section of the foot of a drill pipe carrying a packer swiveled thereon.

Fig. 4 is a cross section on line 4—4 of Fig. 3 showing circulating check valves.

Fig. 5 is a cross section on line 5—5 of Fig. 3 showing the swivel tool elements.

Fig. 6 is a cross section on line 6—6 of Fig. 3 showing a section through the swivel, packed joint.

Fig. 7 is a cross section on line 7—7 of Fig. 3 showing the concentric spindles of the tool.

Fig. 8 is a cross section on line 8—8 of Fig. 3 showing a tubular tool core and the packing jacket provided thereon.

Fig. 9 is a longitudinal section showing diagrammatically the step of cutting a taper seat in the well hole.

Fig. 10 is a longitudinal section showing diagrammatically the step of placing the packing tool.

Fig. 11 is a longitudinal section showing diagrammatically the step of introducing a down pressure check valve and maintaining a circulation above the said valve.

Fig. 12 is a longitudinal section showing diagrammatically the step of discharging fluid from the tool pipe above the check valve by compressed air.

Fig. 13 is a longitudinal section showing diagrammatically the release of air pressure and the upflow of fluid from the formation at the foot of the tool.

Fig. 14 is a longitudinal section showing diagrammatically the discharge from the tool of material collected above the check valve.

Fig. 15 is a central longitudinal section showing diagrammatically the trapping of a final sample of formation fluid retained by a trap valve.

The following specificational paragraphs will suffice to explain a form of apparatus by which the present method, for obtaining a sample of the fluid which occurs naturally at any given level in a well before permanently setting the casing, may be practiced. From this sample it may be determined whether or not the tested level contains water or petroleum, or a mixture of the same in natural state.

Ordinarily the well hole is drilled to the desired depth and it is suspected that oil has been struck by the cutting tools. It having been determined that oil is flowing into the foot of the well, it is then desirable to seal the well at a point above the oil bearing strata to cut off the downflow of water from higher strata. In the diagrammatic drawings, the well is shown as drilled down to any suitable depth with an upper bore B and this is stopped off at a shoulder S which may either be formed during the drilling of the well as by introducing an impervious plug of cement or other material, or by cutting with tools of different diameters. Below the shoulder S the well is drilled down as indicated at W with a diameter considerably smaller than the plug or shoulder bore S, as for instance, by a tool, such as a fish tail bit C. An important feature of the invention is that after the small hole W has been run down and the oil bearing stratum encountered, then means are introduced into the well for determining accurately the level at which to seal the hole or casing to exclude water from the oil stratum.

To that end, I provide for cutting a seat and introducing a removable packing in the well at the seat, which packing will effectively exclude the downward flow of water from levels above the oil stratum.

For instance, the process is disclosed as involving the cutting of a seat 2 at the top of the small well hole W and below the shoulder S above which is formed the larger bore B. This seat 2 is preferably conical so as to facilitate the making, readily, of a simple tight joint.

To cut the tapered seat, I provide a cutter, a form of which consists of a tapering body 3 of suitable length in diameter according to the dimensions of the well hole being drilled. The tapering tool body 3 is provided with longitudinally arranged cutting teeth 4 between the edges of which are formed, by the inclined backs of the teeth, longitudinal grooves 5 which permit the flow of fluid and cuttings upwardly about the tool or reamer while it is being operated and while circulating water or mud is being forced through the drill pipe 6 which is screwed or otherwise suitably connected to the head 3′ of the reamer body 3. The reamer has a longitudinal passageway 3ª to provide for downward circulation of water or mud from the drill pipe 6 to facilitate the cutting of a tapered seat 2. The lower end of the reamer 3 may be attached in any suitable manner to a drill pipe 7 of smaller diameter than the lower end of the taper reamer so that it can carry a cutter as the fish tail cutter C which will operate to redrill the well hole W and to expose the well formation body to permit inflow of fluid in its natural state in the bottom of the well.

The string of drill pipe carrying the reamer is operated a sufficient period of time to provide for the effective drilling of the tapered seat 2, and then this string of tools is removed leaving the hole in a clean condition for the reception of means for taking a sample of the well fluid.

Means for obtaining a test sample from the bottom of the well is shown as including a drill pipe 10 of suitable length, to the lower end of which there is attached a substantial valve tube 11, the upper end of which is provided with an enlarged bore hole to receive the contiguous end of the drill pipe 10 and below which the valve tube is provided with a central bore or passageway 12. In the wall of the valve tube 11 is arranged a suitable number of outlet selfclosing valves 13. These valves are normally pressed inwardly to seats as by springs 14. The valves move in chambers having suitable outlet ports 15, Fig. 4, and it is understood that any number of the valves may be utilized in the valve tube 11.

The lower end of the valve tube 11 is shown as being externally reduced, and to it is attached a spindle head 16 abutting against the lower end of the valve tube 11 and having a bore 16′ of somewhat less diameter than the bore 12 of the valve tube 11. The spindle head 16 is externally reduced, and from its lower end extends a spindle 16ª through which the bore 16′ continues with substantially uniform diameter. Externally secured upon the reduced end of the spindle head 16 is a locking sleeve 17 having a sleeve 17′ abutting against a shoulder provided on the head 16. The lower end of the locking sleeve 17 is internally threaded and receives a locking collar 18 which bears against a packing gland 19 which in turn operates to compress a cylindrical packing medium 20 which is compressed against the inwardly extending central body portion of the locking sleeve 17. This body portion is provided with a shoulder 17ª at its upper part, and upon this shoulder rests the head of a hollow stem 21 shouldered complementary to the shoulder 17ª. In this stem is turnably fitted the hollow spindle 16ª of the spindle head 16. Between the spindle head 16 and the stem head 21, suitable antifriction means as ball bearings 23 are introduced so as to permit the ready rotation of the rotary drill pipe 10 with the attached valve tube 11 and the spindle head 16 and with it also the locking sleeve 17.

The stem 21 extends downwardly somewhat below the lower end of the locking sleeve 17 and on to it is threaded the upper end of a substantial packer body 25 having an upper shoulder 25ª and a lower shoulder 25ᵇ, and between these shoulders there is formed an elongated peripheral seat in which is provided a suitable packing medium 26. This may consist of wood, metal, fibre or substance of other desirable characteristics which, when lowered into the well by the above described carrying parts, is designed to seat firmly upon the conical seat 2 provided therefor in the well hole.

To the lower end of the packer body, 25 there may be attached any suitable coupling 27, and to this may be attached a suction or inlet pipe 28 of sufficiently small diameter to pass freely down into the well hole W below the conical seat 2.

Reference being made to Fig. 10, the packing and swivel device, as above described, is lowered into the well hole and during the lowering action circulation of water or mud from pumps may be maintained as is indicated by the arrows *a*; the pump mud passing down through the swivel drilling head at the top of the well, thence through the open bore provided through the swivel tool and packer, and thence out at the lower end of the foot pipe section 28. This circulation facilitates the lowering of the packing tool into the hole and to its seat.

After the packing tool has been lowered to its position as is indicated in Fig. 11, there is then dropped into the top of the drill pipe 10 a ball valve 30 which is of such diameter as to rest upon the seat formed in the head 16 at the upper end of the bore 16′ therein. When this ball or other suitable valve forming member 30 has taken its seat in the spindle head 16, then circulating fluid is forced into the drill tube and it will take a course as indicated by the arrows *b* downwardly in the drill pipe; the pressure of the mud tending to firmly seat the ball valve 30 and at the same time to open the inwardly closing outlet check valves 13 in the valve tube 11. It will be seen that liquid in the well below the seated packing seal 26 cannot flow upwardly about the packing tool because of the firm bearing of the packer upon its seat 2, and further no fluid can pass into the swivel joint of the tool, since this is internally packed by the packing ring 20 interposed between the locking sleeve 17 and the stem 21 of the packing body 25. The circulation of the mud up about the drill pipe 10 prevents the latter from becoming stuck or "freezing" in the well hole, and at the same time enables the substantially constant rotation of the drill pipe which further prevents it from freezing in place, though the packing body or plug may be held stationary in its seat 2.

There is neither circulation nor rotation of the foot section 28 attached to the packer.

The next step in the process is to effect the expulsion of the liquid which is supported in the tool above the check valve 30, and this is accomplished by turning compressed air into the head of the drill pipe 10, the pressure acting upon the column of mud M above the valve 30 and forcing this down to and out through the outlet valves 13. The ejected mud and fluid passes upwardly as shown by arrows *c* to and out at the head of the well. The air pressure is maintained for such a period and at such a degree as will result in the expulsion of as much of the fluid in the drill pipe string 10 as is practicable; downward flow of the fluid through the packer being prevented by the check valve 30, this step being accomplished with rotation of the drill pipe 10.

Having ejected the mud in the drill pipe by compressed air, the next step is to turn off the compressed air and open the head of the well so as to permit the air to become displaced under static pressure of the fluid in the well below the seal or packer 26. The greater degree of pressure of fluid in the well hole below the packer therefore results in an upward movement of the fluid through the foot pipe 28 and through the packer 26 and up against the check valve 30 so that this is lifted and the well fluid will then be free to rise as is indicated by arrow *d*, Fig. 13. Concurrently with this operation the outlet valves 13 are automatically seated both by the action of their springs 14 and by the pressure of the liquid outside of the string of pipe 10. When an equilibrium has been produced in the drill pipe, there will be above the well fluid F, Fig. 13, a column of the circulating mud M and, unless this mud has been lifted to the top of the well there will be above the mud M air in the pipe 10.

It might be mentioned at this point that instead of forcing the circulating mud out through the outlet valves by compressed air, that the mud can be pumped up through the drill pipe 10, or it can be bailed up through the drill pipe. The object of removing circulating mud from within the drill pipe stem is to reduce the quantity thereof as much as practicable so that at a later step it will be possible to obtain samples of the natural well fluid free from circulation mud dilution.

When pressure has been removed from the seated check valve 30 in the packing tool, the valve will be lifted as above described by the greater pressure of the fluid in the well hole, and as this rises above the check valve and as equilibrium is established, the check valve 30 again returns to its seat as shown in Fig. 14. It is then possible to again turn fluid under pressure into the drill pipe 10 above the seated valve 30, Fig. 14, and the material retained in the drill pipe above the valve is forced out through the outlet valves 13. This will secure the removal from above the valve of such of the well fluid as may have been mixed with the circulating fluid and with the water obtaining above the sealing packer. The intermittent upflow through the packer and past the check valve 30 and the intermittent ejection thereof from the bottom of the pipe 10, is continued for such a period of time as will entirely remove the diluted portion of fluid from the small hole and string of tools. Thereafter, fluid pressure is turned off from the drill pipe 10 and the head of the well is opened and a trap valve 33 is dropped into the drill pipe.

The trap valve 33 is preferably of greater diameter than the bore of the valve tube 11, and this valve forming element, of whatever its character, will seat upon the end of the bore 12 and therefore will trap such of the natural fluid as rises from the bottom of the foot pipe 28 through the packer and into the lower portion of the drill pipe 10 as is shown in Fig. 15. This trapped sample, therefore, is a true indication of the nature of the material that is found in the well hole below the sealing packer, and the string of pipe with the packer attached may then be lifted from the well hole, and the sample of fluid collected in the trap may be removed from the tool and analyzed.

It will be seen that the above method enables the obtaining of a sample of the well fluid from below any individual level in the length of the well and if it be found that the well should be sealed at the first location of the packing device, the usual procedure of sealing may be completed. On the other hand, if it is found that the sample from the test indicates that there is water below the test level, then the well hole W would be redrilled to such diameter as to permit it to receive the tapering reamer at a lower point for making a new seal and the testing operation then repeated. Repetition may be made as often as necessary before finally sealing the well at or just above the oil bearing stratum.

To prevent loss of lubricating oil from the ball bearing chamber, the spindle 16[a] may be packed as at 16[b] in the stem 21.

Since but a short length of foot pipe 28 is used, it will not be subjected to much friction and it will be readily possible to recover the whole string of parts forming the tool, more especially true since it is intended that the rotation of the drill pipe shall be stopped for only short intervals.

Various modifications and changes may be resorted to within the spirit of the invention as claimed.

What is claimed is:

1. A device for obtaining test samples from drilled wells comprising a pipe having a swiveled packer at its foot to engage a seat in the well hole, said device having valve means permitting expulsion of fluid by displacement from within the pipe into the space outside of the pipe above the packer but preventing flow of fluid in the opposite direction.

2. A device for obtaining test samples from drilled wells comprising a pipe having a swiveled packer at its foot to engage a seat in the well hole, said device having valve means permitting expulsion of fluid by displacement from within the pipe into the space outside of the pipe above the packer but preventing flow in the opposite direction, and means for trapping sample fluid in the pipe above said valve means.

3. A device for obtaining test samples from drilled wells comprising a pipe, a packer mounted on the pipe adapted to engage a seat in a well hole and prevent fluid in the well above the packer from entering the pipe below the packer, valve means permitting fluid in the well to enter the pipe from below the packer and become entrapped therein, and valve means permitting fluid in the pipe above the packer to be displaced therefrom into the space outside of the pipe above the packer but preventing flow in the opposite direction.

4. A packing tool comprising a rotatable pipe, a tubular member secured to said pipe, a swiveled packer secured to said tubular member, and valves associated with said tubular member permitting fluid to be forced from within the tubular member outwardly through the sides thereof and preventing flow of fluid in the opposite direction.

5. A packing tool comprising a pipe, a packer movably mounted upon said pipe, a valve adapted to permit upward flow through said packer but serving to prevent downward flow therethrough, and means permitting fluid to be forced from said pipe into the space about said pipe above said packer but preventing flow in the opposite direction.

6. A packing tool comprising a pipe, a swiveled packer mounted upon said pipe, a check valve permitting fluid to pass upwardly through said packer but preventing downward flow therethrough a check valve permitting fluid to be forced from within said pipe into the space about said pipe above said packer but preventing flow in the opposite direction, and a check valve adapted to be placed in said pipe while in the well to prevent forcing of the fluid from within said pipe through the walls of the pipe.

7. A packing tool comprising a pipe, a tubular member mounted upon said pipe, a swiveled packer mounted upon said tubular member, outwardly opening check valves mounted in said tubular member above said packer, valve seats formed upon said tubular member above and below said check valves, and valves adapted to be inserted into said pipe while in a well to seat upon said seats as and for the purpose described.

8. A well testing device comprising a body part having a lower pin projecting therefrom and forming a shoulder with the body part, a downwardly tapering packer surrounding said pin for engaging against said shoulder, and means at the lower end of said pin for constituting an abutment for said packer, said body part and pin having a passage therethrough, and means adjoining the upper end of said body part for opening and closing the communication of this passage with the casing above.

GEORGE A. MACREADY.